US011948432B2

(12) United States Patent
Chesworth et al.

(10) Patent No.: US 11,948,432 B2
(45) Date of Patent: *Apr. 2, 2024

(54) GAMING SYSTEMS AND METHODS USING MOVEABLE GAME ELEMENTS

(71) Applicant: LNW Gaming, Inc., Las Vegas, NV (US)

(72) Inventors: Jack Chesworth, Newtown (AU); Ross Malcolm Gilbertson, Ryde (AU); Samuel Goodall, Alexandria (AU); Tod Sarlemyn, Coogee (AU); Peter Wilkins, Curl Curl (AU)

(73) Assignee: LNW Gaming, Inc., Las Vegas, NV (US)

( * ) Notice: Subject to any disclaimer, the term of this patent is extended or adjusted under 35 U.S.C. 154(b) by 119 days.

This patent is subject to a terminal disclaimer.

(21) Appl. No.: 17/824,180

(22) Filed: May 25, 2022

(65) Prior Publication Data

US 2022/0284771 A1 Sep. 8, 2022

Related U.S. Application Data

(63) Continuation of application No. 16/841,985, filed on Apr. 7, 2020, now Pat. No. 11,462,076.

(60) Provisional application No. 62/831,264, filed on Apr. 9, 2019.

(51) Int. Cl.
*G07F 17/32* (2006.01)
*G07C 15/00* (2006.01)

(52) U.S. Cl.
CPC ....... *G07F 17/3262* (2013.01); *G07C 15/006* (2013.01); *G07F 17/3213* (2013.01)

(58) Field of Classification Search
CPC ...... A63F 5/045; A63F 5/046; G07F 17/3213; G07F 17/3262
See application file for complete search history.

(56) References Cited

U.S. PATENT DOCUMENTS

| | | | |
|---|---|---|---|
| 6,168,520 B1 | 1/2001 | Baerlocher et al. | |
| 6,224,483 B1 | 5/2001 | Mayeroff | |
| 7,442,123 B2 | 10/2008 | Brill et al. | |
| 7,604,539 B2 | 10/2009 | Hartl et al. | |
| 8,353,762 B2 * | 1/2013 | Rodgers .............. | G07F 17/3225 463/20 |
| 8,523,672 B2 | 9/2013 | Kryuchkov et al. | |
| 8,771,051 B2 | 7/2014 | Mattice et al. | |
| 8,956,216 B1 | 2/2015 | Lesourd et al. | |

(Continued)

*Primary Examiner* — David L Lewis
*Assistant Examiner* — Robert E Mosser

(57) ABSTRACT

Systems and methods of operating a wheel are described herein. The wheel includes a plurality of game wedges and a wedge selector. The plurality of game wedges includes a first variable wedge, a second variable wedge, and at least one moveable wedge. Each game wedge is associated with a respective award and a respective probability of selection. The method includes generating, using a random-number generator, a random number representing a selected game wedge of the plurality of game wedges, causing the wedge selector to visibly identify the selected game wedge, and in response to a trigger game wedge of the game wedges being the selected game wedge, shifting the moveable wedge around the wheel to change a visible size of the first variable wedge and the respective probability of selection of the first variable game wedge proportional to the change in visible size.

20 Claims, 11 Drawing Sheets

(56) References Cited

U.S. PATENT DOCUMENTS

| | | | |
|---|---|---|---|
| 8,956,217 | B1 | 2/2015 | Brooks et al. |
| 8,979,636 | B2 | 3/2015 | Brooks et al. |
| 8,998,704 | B2 | 4/2015 | Lesourd et al. |
| 9,070,248 | B2 | 6/2015 | Brooks et al. |
| 9,552,686 | B2 | 1/2017 | Mattice et al. |
| 9,672,684 | B2 | 6/2017 | Kido et al. |
| 9,821,218 | B2 | 11/2017 | Elias et al. |
| 2005/0119043 | A1 | 6/2005 | Berman et al. |
| 2011/0230249 | A1 | 9/2011 | Harris |
| 2018/0071617 | A1 | 3/2018 | Elias et al. |
| 2019/0188946 | A1 | 6/2019 | Elias et al. |

* cited by examiner

GAMING SYSTEMS AND METHODS USING MOVEABLE GAME ELEMENTS

RELATED APPLICATIONS

This application is a continuation of U.S. patent application Ser. No. 16/841,985, filed Apr. 7, 2020, which claims the priority benefit of U.S. Provisional Patent Application Ser. No. 62/831,264, filed Apr. 9, 2019, and is related to patent application Ser. Nos. 29/685,933, 29/685,941, and 29/685,942, each filed Apr. 1, 2019, wherein the contents of each application are incorporated herein in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming systems, apparatus, and methods and, more particularly, to gaming systems using moveable game elements to adjust the visible size and/or outcome probability of other game elements.

BACKGROUND OF THE INVENTION

The casino gaming industry employs a variety of visual, audio, and/or game features to engage players in casino wagering games. At least some game features may use physical game elements, virtual game elements (i.e., graphically displayed game elements), and/or combinations thereof to visually indicate a set of possible outcomes (and the corresponding set of awards) and a spin selecting one of the possible outcomes to a player. These game features may include a counter for a number of spins or attempts remaining before the game feature concludes, and the game features may also include one or more outcomes that award the player with additional spins to extend the game feature. While some game features may have a relatively low probability of achieving an outcome awarding additional spins (e.g., less than 5%) to limit the duration of the game feature, other game features may use a substantially higher probability of additional spins to attract and engage players.

However, this increased probability may have a detrimental effect to the viability and efficiency of the game feature. That is, the game feature may be prolonged through repeated awards of additional spins, which may result in over allocation of payouts to the game feature and excessively taxing the resources of the gaming system providing the game feature. Over allocation of payouts to a single game feature may cause the payouts of other game features to be reduced to meet a predetermined payback percentage for the casino wagering game or may cause the casino wagering game to become unsustainable. The resources taxed by a prolonged game feature may include, but are not limited to, allocation of computing and memory resources to the game feature that may be used for other aspects of the gaming system, increased random number generation draws for the additional spins, and/or burdening mechanical components that are actuated with each spin, which may reduce the life of the mechanical components.

Accordingly, there is a need for innovative game features that balance engaging bonus spins awards with sustainable and efficient structure to decrease the payout allocation of the game features and reduce (or otherwise eliminate) the computing, memory, and/or mechanical burden caused by extended game features.

SUMMARY OF THE INVENTION

According to one aspect of the present disclosure, a method of operating a wheel is described herein. The method may be at least partially performed by game-logic circuitry and a display device of a gaming machine. The wheel includes a plurality of game wedges and a wedge selector. The plurality of game wedges includes a first variable wedge, a second variable wedge, and at least one moveable wedge. Each game wedge is associated with a respective award and a respective probability of selection. The method includes generating, using a random-number generator, a random number representing a selected game wedge of the plurality of game wedges, causing the wedge selector to visibly identify the selected game wedge, and in response to a trigger game wedge of the game wedges being the selected game wedge, shifting the moveable wedge around the wheel to change a visible size of the first variable wedge and the respective probability of selection of the first variable game wedge proportional to the change in visible size.

According to another aspect of the present disclosure, a gaming machine comprises a display device and game-logic circuitry. The display device presents a wedge selector and a plurality of game wedges defining a wheel. The game wedges include a first variable wedge, a second variable wedge, and at least one moveable wedge. Each game wedge is associated with a respective outcome probability and a respective award. The game-logic circuitry generates, via a random-number generator of the game-logic circuitry, a random number representing a selected game wedge of the plurality of game wedges based on the respective outcome probabilities of the plurality of game wedges, causes, via the display device, the wedge selector to visibly identify the selected game wedge, and in response to a trigger game wedge of the plurality of wedges being the selected game wedge, causes the moveable wedge to shift around the wheel to change a visible size of the first variable wedge and the respective outcome probability of the first variable game wedge proportional to the change in visible size.

According to yet another aspect of the present disclosure, a gaming system includes a gaming machine and game-logic circuitry. The gaming machine includes a display device that presents a wedge selector and a plurality of game wedges defining a wheel. The plurality of game wedges including a first variable wedge, a second variable wedge, and at least one moveable wedge. Each game is associated with a respective outcome probability and a respective award. The game-logic circuitry generates, via a random-number generator of the game-logic circuitry, a random number representing a selected game wedge of the plurality of game wedges based on the respective outcome probabilities of the plurality of game wedges, causes, via the display device, the wedge selector to visibly identify the selected game wedge; and in response to a trigger game wedge of the plurality of game wedges being the selected game wedge, causes the moveable wedge to shift around the wheel to change a visible size of the first variable wedge and the respective outcome probability of the first variable game wedge proportional to the change in visible size.

Additional aspects of the invention will be apparent to those of ordinary skill in the art in view of the detailed description of various embodiments, which is made with reference to the drawings, a brief description of which is provided below.

Figure 1:
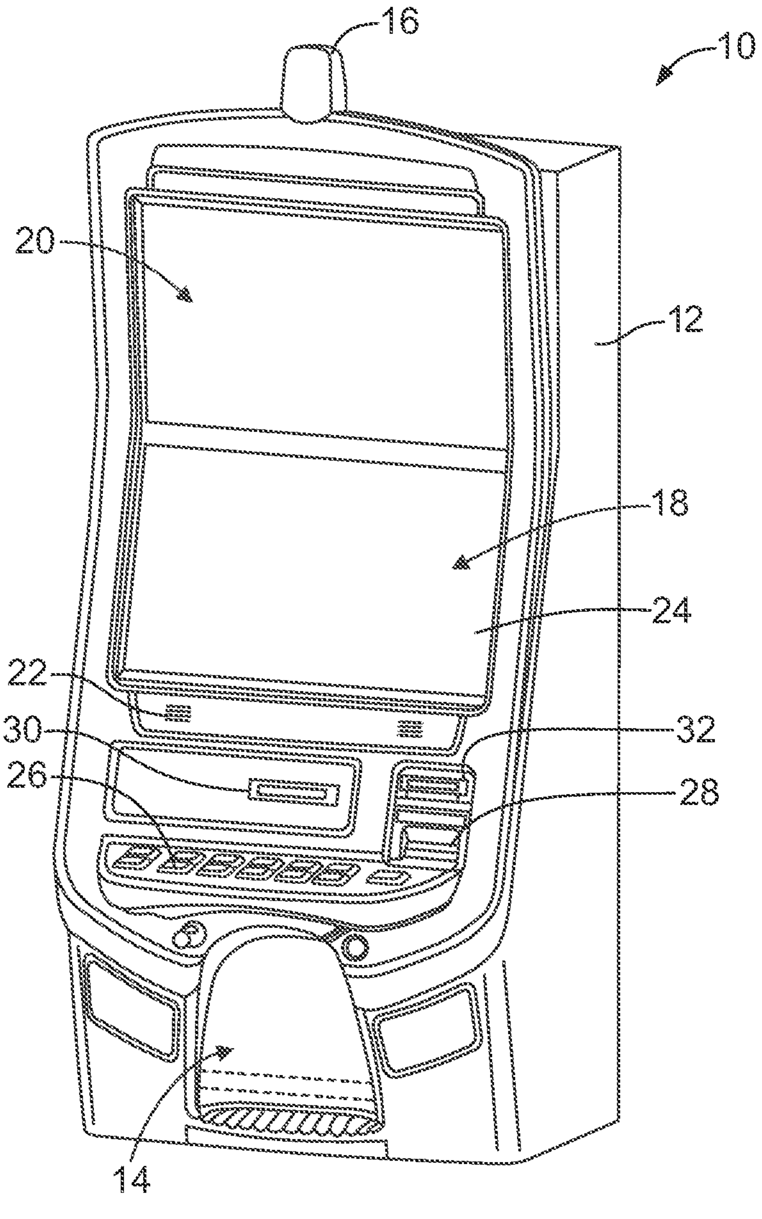
FIG. 1 is a perspective view of a free-standing gaming machine according to an embodiment of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof such as, and without limitation, a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
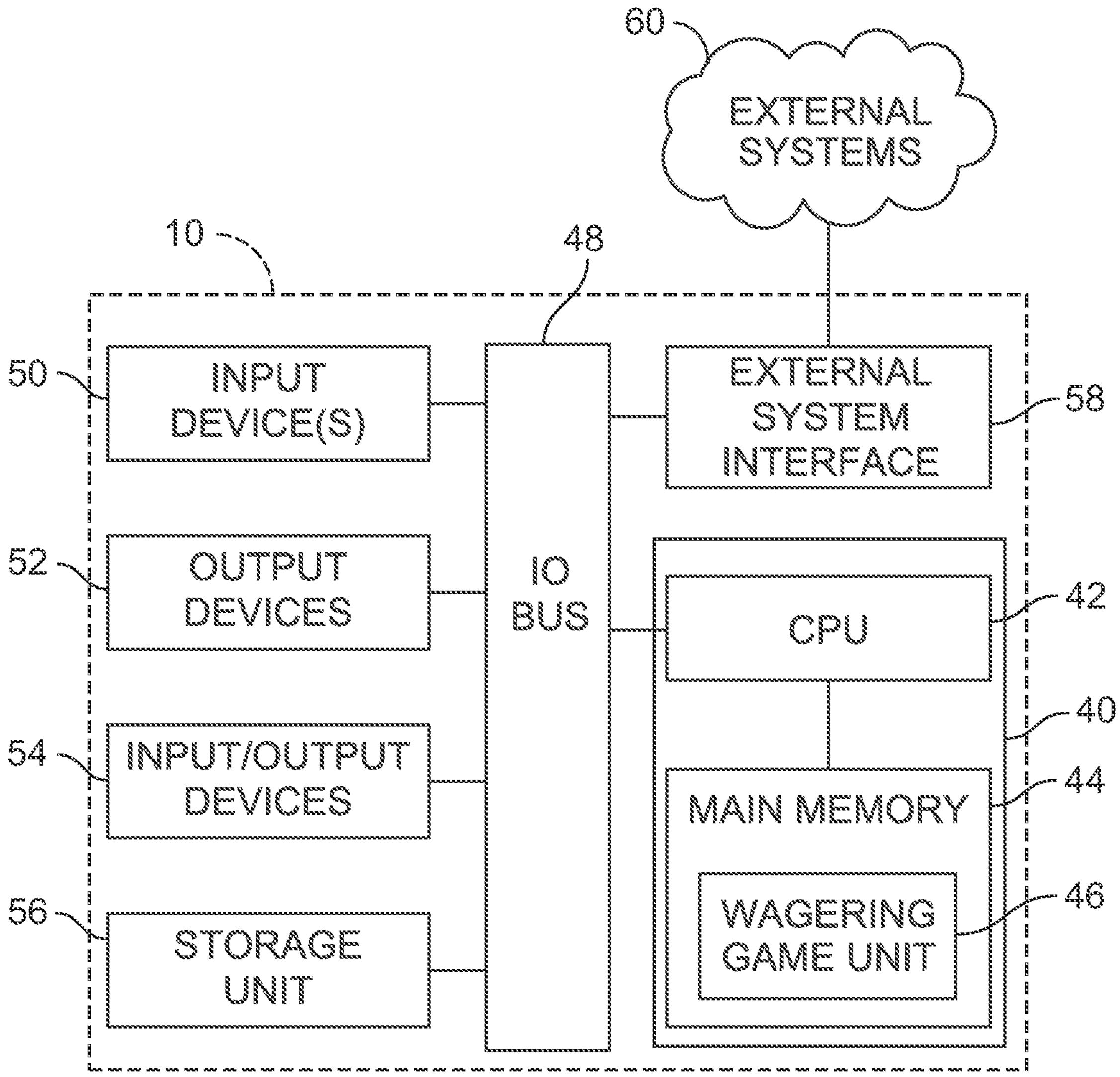
FIG. 2 is a schematic view of a gaming system according to an embodiment of the present disclosure.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
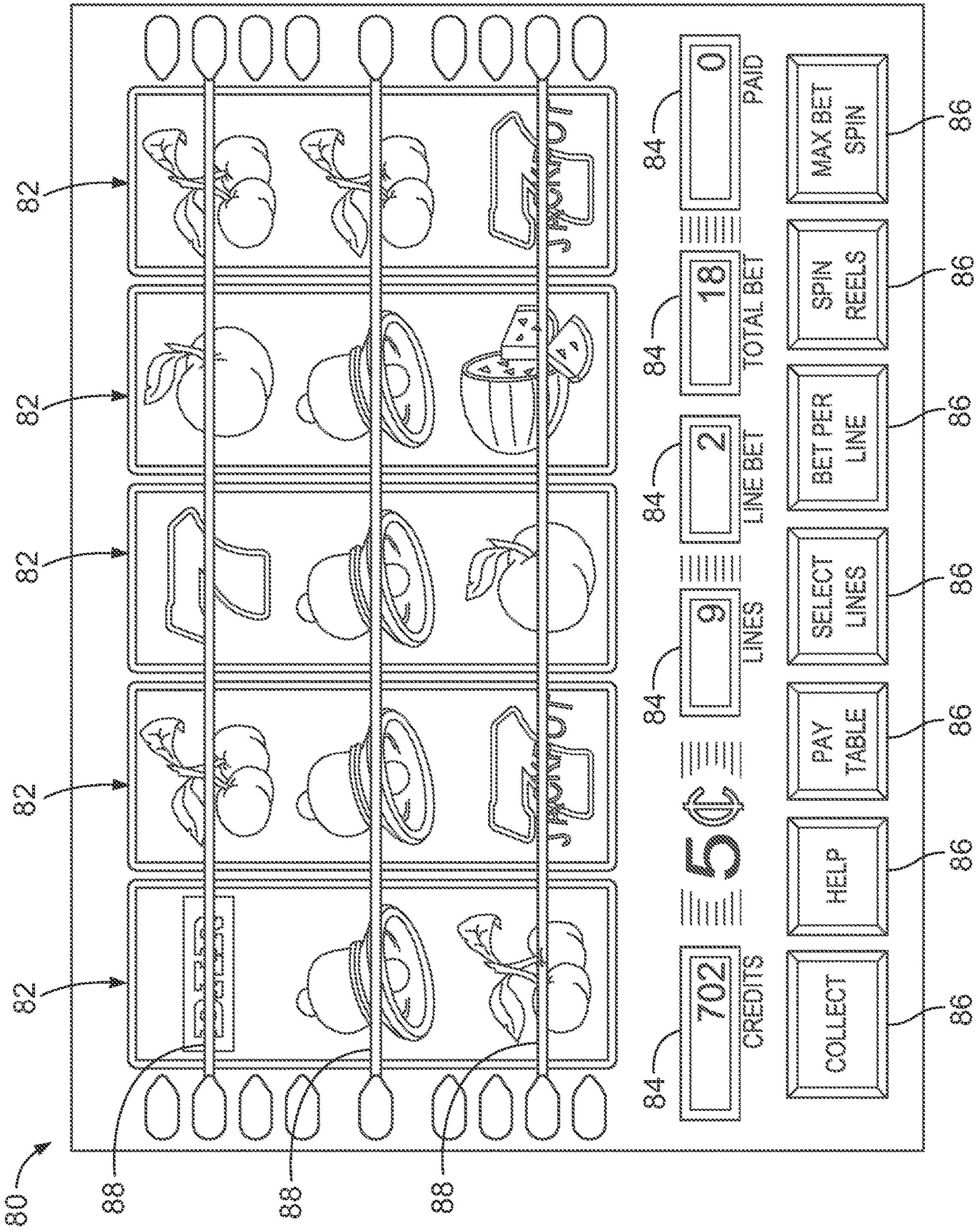
FIG. 3 is an image of an exemplary basic-game screen of a wagering game displayed on a gaming machine, according to an embodiment of the present disclosure.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager covered by or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

In the example gaming systems and methods described herein, a wedge selection game is conducted using a game presentation object divided into a plurality of geometric shapes referred to hereinafter as "game wedges". The visual geometry of the game wedges may be linked to an outcome probability of the respective wedge, and manipulation of the visual geometry during the wedge selection game may alter the underlying outcome probability of a particular wedge being selected. In some embodiments, the wedge selection game is a portion of a casino wagering game. In one example, the wedge selection game is a feature game that is initiated in response to one or more trigger conditions in a base game (e.g., a reel-based game, such as the game shown in FIG. 3). In another example, the wedge selection game is a base game that includes one or more trigger conditions for initiating one or more feature games. In other embodiments, the wedge selection game is a standalone game.

Figure 4:
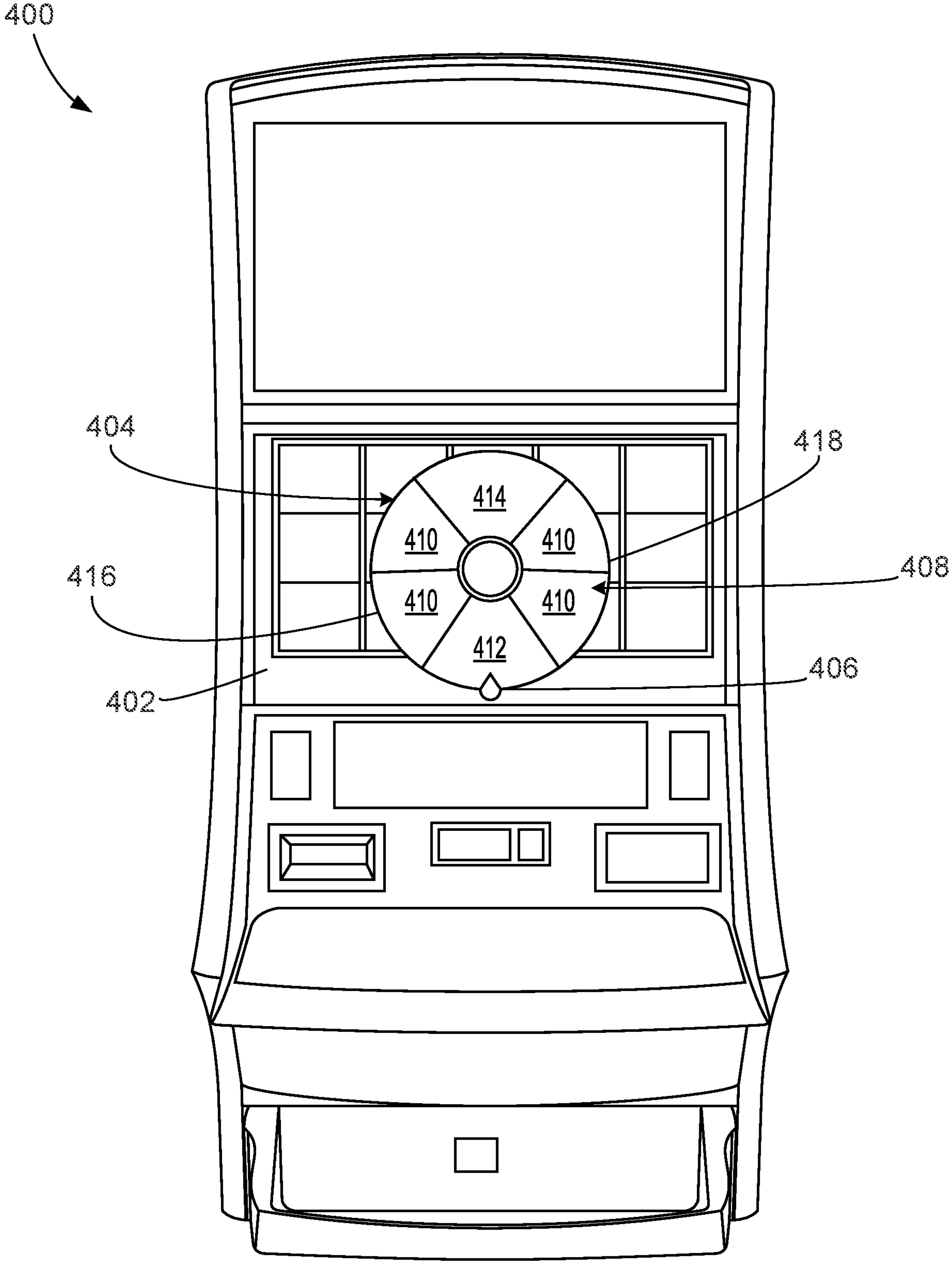
FIG. 4 is a front-facing view of an example gaming machine presenting a wedge selection game according to one or more embodiments of the present disclosure.

Referring now to FIG. 4, an example gaming system 400 for conducting an example wedge selection game is shown. The gaming system 400 includes a gaming machine 401 that may be substantially similar to the gaming machine 10 shown in FIG. 1. At least a portion of the functionality described herein may be performed, controlled, or caused via game-logic circuitry (not shown) of the gaming machine 401 similar to the game-logic circuitry 40 shown in FIG. 2. In some embodiments, the game-logic circuitry is at least partially located remotely from the gaming machine 401 within the gaming system 400. In other embodiments, the gaming system 400 may include additional, fewer, or alternative components, including those described elsewhere herein.

In the example embodiment, the gaming machine 401 includes a display device 402 for presenting a casino wagering game including the wedge selection game. The display device 402 may be a digital display, a mechanical display device (i.e., physical objects instead of graphical representations), or a combination thereof. For example, the display device 402 may include a digital display in addition to physical game elements to provide a sense of depth and separation of game elements to the player and/or to simplify the programming of overlapping game elements within a game.

The display device 402 is configured to present one or more game presentation objects 404 and one or more wedge selectors 406 for play of the wedge selection game. Each game presentation object 404 is associated with at least one wedge selector 406. In the example embodiment, the game presentation object 404 is a wheel or circular object, and the wedge selector 406 is an arrow that travels around the circumference of the game presentation object 404. In other embodiments, the game presentation object 404 and/or the wedge selector 406 may have a different shape and/or functionality. For example, the game presentation object 404 may be a rectangle, line, or oval. In another example, instead of travelling around a circumference of the game presentation object 404, the wedge selector 406 may extend from and rotate around the center of the game presentation object 404. The game presentation object 404 is referred to herein specifically as wheel 404 for clarity purposes, though it is to be understood that the features and functionality described herein may apply to other types of game presentation objects.

The wheel 404 is divided into a plurality of game wedges 408. The game wedges 408 are geometrical shapes that represent various awards of the wedge selection game and outcome probabilities of said awards. That is, the game wedges 408 provide to a player a visual representation of a chance to receive a respective award or awards for each "spin" within the wedge selection game. The game wedges 408 may have any suitable shape and/or size to define the wheel 404. That is, although the term "wedge" is typically used in reference to circular segments, any other suitable segmented shapes may be used as game wedges 408.

In at least some embodiments, the visual size of each game wedge 408 relative to the size of the wheel 404 may represent the respective outcome probability of the wedge 408 being selected, thereby providing the player with a relatively easy and understandable interface for identifying the relative odds of obtaining any available award represented by the game wedges 408. In some embodiments, the relative size of the game wedges 408 is a 1:1 match to the corresponding outcome probabilities of each wedge. Some jurisdictions may have regulations that require such representation, and the 1:1 match may assist the player in quickly and easily identifying dynamic changes to the outcome probability of a particular game wedge 408 by reflecting the changes as visual changes to the size of the game wedge 408. In other embodiments, the size of the wedges 408 may have a different suitable relationship to the corresponding outcome probabilities.

In the example embodiment, a determination is made using random number generation to select one of the game wedges 408 as the outcome of a spin. As an example of such determination, one or more random numbers are assigned to each game wedge 408, a random number is generated by the system 400, and the game wedge 408 assigned a matching number is selected. The wedge selector 406 is animated (e.g., through graphical animation and/or mechanical manipulation) through a spin process until stopping on the selected game wedge 408 to present the player with the determined game outcome. Although the term "spin" is used herein to describe a game round, i.e., the combination of (i) the determination of a selected game wedge 408, (ii) the animation of the wedge selector 406, and (iii) stopping the wedge selector 406 at the selected game wedge 408, particularly at an outer arc of the selected game wedge 408, it is to be understood that other animations, intervening steps, alternative steps, and the like may be used for at least some embodiments. The award associated with the selected game wedge 408 is then provided to the player prior to a subsequent spin or conclusion of the wedge selection game. The award may include, but is not limited to, credits, tokens, bonus spins, a feature game trigger condition, and/or other awards that impact play of the casino wagering game. Some awards may not impact the casino wagering game, but provide a benefit to the player (e.g., a free drink awarded to the player).

In the example embodiment, the game wedges 408 include a plurality of moveable wedges 410, a first variable wedge 412, and a second variable wedge 414. In some embodiments, the game wedges 408 may include additional wedges, such as hidden wedges not visible to the player at the beginning of the wedge selection game as described in detail below. The game wedges 408 may include one or more visual aspects and/or features to help distinguish between adjacent wedges and different types of wedges (e.g., distinguish between the moveable wedges 410 and the first variable wedge). The visual aspects and/or features may include, but are not limited, wedge color, visual borders between wedges, visible texture, text, visual depth of wedges, and the like. In addition to distinguishing the game wedges 408, the visual aspects and/or features may provide the player information regarding the award associated with each game wedge 408. For example, each game wedge 408 may include text indicating a credit award, a bonus spin award, a jackpot award, and/or other awards available to the player.

In the example embodiment, the moveable wedges 410 are positioned circumferentially between the variable wedges 412, 414 such that the variable wedges 412, 414 diametrically oppose each other on the wheel 404. More specifically, the moveable wedges 410 include a first set of moveable wedges 416 and a second set of moveable wedges 418 to separate the variable wedges 412, 414. In other embodiments, the moveable wedges 410 and the variable wedges 412, 414 may be in a different suitable configuration. Although two moveable wedges 410 are shown in each of the first and second sets, it is to be understood that the first set 416 and/or the second set 418 may include a different number of moveable wedges 410 (including one wedge 410). In other embodiments, the moveable wedges 410 may include a different number of sets (including a single set of wedges 410). In some embodiments, the wheel 404 may include only a single moveable wedge 510.

The moveable wedges 410 may have a fixed size or a variable size that is dynamically adjusted based on one or more trigger conditions. The trigger conditions for adjusting the size of the moveable wedges may occur within the wedge selection game and/or external to the wedge selection game (e.g., a player account is recognized, an event occurs within a base game, etc.). In the example embodiment, the size (and the underlying outcome probabilities) of the moveable wedges 410 remain fixed through the wedge selection game.

During play of the wedge selection game, the moveable wedges 410 are configured to shift around the wheel 404 to visually indicate dynamic changes to the underlying outcome probabilities of one or more game wedges 408. More specifically, as the moveable wedges 410 shift, the moveable wedges 410 at least partially visually cover or overlap one or more wedges, which also indicates that the one or more covered wedges 408 have decreasing outcome probabilities for subsequent spins. Conversely, one or more wedges 408 may be at least partially exposed or visible in the space on the wheel 404 that the moveable wedges have shifted from. These exposed (or partially exposed) wedges 408 may have an increased outcome probability that matches the increased visible exposure of the wedges 408. This dynamic adjustment of outcome probabilities and the corresponding visual changes may be in response to one or more trigger conditions. In at least some embodiments, the trigger condition is the selection of a trigger game wedge. One or more wedges 408 may be assigned as a trigger game wedge, including the moveable wedges 410, the first variable wedge 412, and the second variable wedge 414. In the example embodiment, the first variable wedge 412 is the trigger game wedge. In other embodiments, the trigger condition may include additional or alternative suitable events or parameters, such as historical selections, a wager amount, and the like.

The trigger conditions may include one or more progressive trigger conditions that trigger in response to a plurality of outcomes of the wedge selection game. The progressive trigger conditions may simply include, as an example, a number of past spins, or may include parameters that factor in game performance. In one example, the trigger conditions to shift the moveable wedges 410 may include a sequence of outcomes in the wedge selection game. That is, the shift occurs in response to several outcomes (consecutive or otherwise) of the wedge selection game. For example, the shift may be in response to a number of outcomes selecting the trigger game wedge exceeding a trigger threshold (e.g., two or three times). The sequence may be predetermined or dynamically determined, and the sequence may not be limited to just outcomes selecting a single trigger game wedge. In other embodiments, other progression-based trigger conditions may be used, such as point thresholds. That is, each game wedge 408 may be associated with a respective number of points that is added to the player's accumulated points in response to an outcome selecting the game wedge. In response to the player's accumulated points exceeding one or more point thresholds, the shift of the moveable wedges 410 may be initiated.

In certain embodiments, the display device 402 may be configured to visibly convey progress on one or more progressive trigger conditions. For example, game wedges 408 within a sequence that triggers a shift may change in appearance in response to being selected as an outcome, such as changing color (e.g., from blue progressively to red). In another example, the display device 402 may be configured to display the player's accumulated points and at least one upcoming point threshold.

In some embodiments, the variable wedges 412, 414 are configured to be adjusted in both visible size and outcome probability in response to the moveable wedges 410 shifting. The moveable wedges 410 may move together in a single direction (i.e., clockwise or counter-clockwise), or the moveable wedges 410 may move in different directions and/or at angles of movement around the wheel 404. For example, the first set 416 and the second set 418 may move in equal and opposite directions to converge towards the first variable edge 412, thereby reducing the visible size and outcome probability of the first variable edge 412. In such an example, the second variable wedge 414 may increase in size and outcome probability inversely proportional to the decrease in size and outcome probability of the first variable wedge 412 by gaining the space of the wheel 404 previously occupied by the moveable wedges 410 prior to shifting. In some embodiments, the shift may uncovered previously hidden wedges 408 rather than add to the second variable wedge 414, and thus the second variable wedge 414 may not increase inversely proportional to the first variable wedge or may remain fixed in size and outcome probability.

Figure 5:
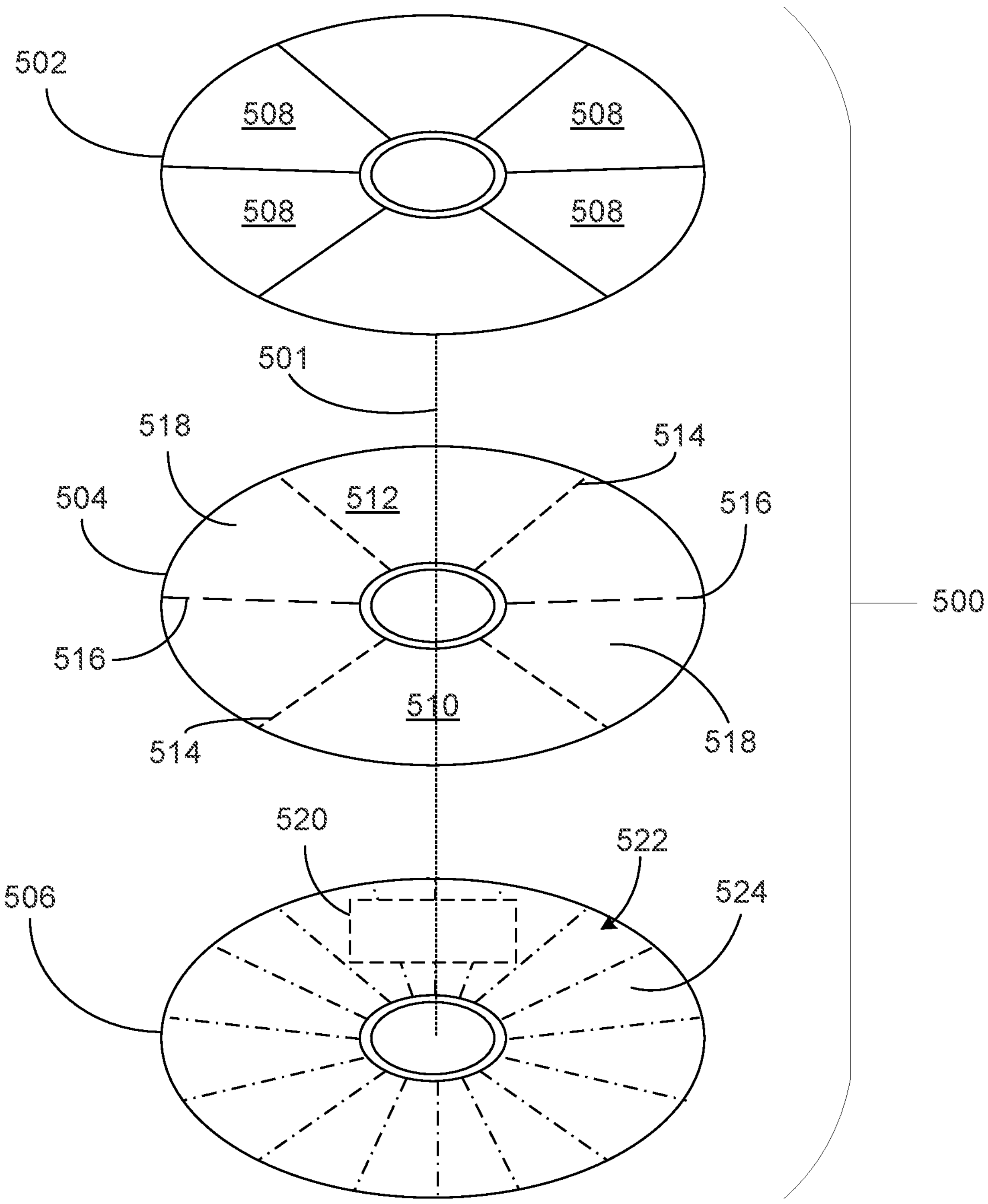
FIG. 5 is an exploded view of an exemplary wheel for a wedge selection game according to one or more embodiments of the present disclosure.

FIG. 5 is an exploded view of an example wheel 500 (similar to the wheel 404, shown in FIG. 4) depicting the wheel 500 as a composition of layers. In some embodiments, the wheel 500 is a mechanical device (i.e., a physical device), and the layers are physical wheels arranged in a stack to appear as a singular wheel to the player. In other embodiments, the wheel 500 is a graphical object on a digital display device, and the layers described herein relate to the visual priority assigned to elements for display. That is, a "top" layer may have the greatest priority for display when top layer game elements overlap game elements of "lower" layers, and as a result, the lower layer game elements may not be displayed or are displayed at a lower opacity than the top layer game elements when overlapping. It is to be understood that these separate layers may not represent discrete objects within code for displaying the wheel 500, but rather may be the different visual priority parameters assigned to each game element of the wheel 500. In yet other embodiments, the wheel 500 may be a hybrid device that incorporates both mechanical layers and graphical layers on a display device.

In the example embodiment, the wheel 500 includes a first layer 502, a second layer 504, and a third layer 506 defined along a central axis 501. In other embodiments, the wheel 500 may include additional, fewer, or alternative layers and/or game element configurations, including those described elsewhere herein. In certain embodiments, the layers described herein may be further divided into sub-layers such that game elements residing on the same layer may have a visibility hierarchy between each other. The first layer 502 is the "top" layer, while the third layer 506 is the "bottom" layer of the wheel 500. As used herein, a "top" layer is given the highest priority of visibility to a player facing the wheel 500, while a "bottom" layer is given the lowest priority of visibility. This priority may be determined (i) by placing the higher priority layers physically between the player and lower priority layers, and/or (ii) by assigning ranked priority parameters to graphical game elements to simulate the physical placement of layers in (i).

The first layer 502 includes moveable wedges 508, and the second layer 504 includes a first variable wedge 510 and a second variable wedge 512. The moveable wedges 508 and the variable wedges 510, 512 may be substantially similar to the corresponding elements of the wheel 404 (shown in FIG. 4). In some embodiments, the moveable wedges 508 have the same visibility priority to each other, and therefore do not overlap each other when shifting. That is, each moveable wedge 508 can only shift around the wheel 500 in a particular direction until another moveable wedge 508 is reached; at this point, the following moveable wedge 508 can only move if the leading moveable wedge 508 also moves in the same direction. In other embodiments, the first layer 502 may be divided into sub-layers having one or more moveable wedges 508 such that the moveable wedges 508 may overlap each other. In such embodiments, overlapping the moveable wedges 508 may cause the awards associated with the overlapping moveable wedges to be aggregated together. In the example embodiment, the second layer 504 is divided between the first variable wedge 510 and the second variable wedge 512. In certain embodiments, the variable wedges 510, 512 have two different types of boundaries: visible boundaries 514 and wedge boundaries 516.

When game elements from upper layers (e.g., the moveable wedges 508 on the first layer 502) partially overlap with one of the variable wedges 512, thereby blocking a portion of the variable wedge 510, 512 from visibility, one or more visible boundaries 514 are created. The visible boundaries 514 at least partially define the visible size of the respective variable wedge 510, 512, and provide visual indication to the player of the current outcome probability of the variable wedge 510, 512 relative to other outcome probabilities of the wheel 500. The visible boundaries 514 are dynamic throughout the wedge selection game because the visible boundaries 514 are dependent upon the relative position of the moveable wedges 508 that are configured to shift in response to one or more trigger conditions. In some examples, the moveable wedges 508 may be configured to shift in such a manner that the moveable wedges 508 cover at least one variable wedge 510, 512 in its entirety from visible sight of the player, thereby eliminating any visible boundaries 514 of the covered variable wedge 510, 512 until the covered variable wedge 510, 512 is at least partially uncovered.

The wedge boundaries 516 are maximum boundaries that separate a particular wedge from adjacent wedges within the same layer of the wheel 500. The visible boundaries 514 of a respective variable wedge 510, 512 may be equal to or less than the corresponding wedge boundaries 516. In the example embodiment, the first variable wedge 510 is separated from the second variable wedge 512 by the wedge boundaries 516. Although the wedge boundaries 516 are shown to create a diametric boundary through the wheel 500 that equally separates the variable wedges 510, 512, other suitable configurations of wedge boundaries 516 may be used (including configurations with intervening wedges between the variable wedges 510, 512). In certain embodiments, one or more wedge boundaries 516 may be dynamically positioned on the second layer 504 responsive to one or more parameters (e.g., performance in a base game, wager amounts and/or frequency, etc.). In some embodiments, the visible boundaries 514 and the wedge boundaries 516 may match each other. That is, the moveable wedges 508 do not overlap the variable wedges 510, 512, but rather the variables wedges 510, 512 are defined in their entirety within visible space of the wheel 500 unoccupied by the moveable wedges 508.

In certain embodiments, the second layer 504 may include additional wedges beyond the variable wedges 510, 512. In one example, the visible boundaries 514 and wedge boundaries 516 define hidden wedges 518 rather than hidden portions of the variable wedges 510, 512. That is, the hidden wedges 518 are hidden from view by the moveable wedges in the initial state of the wheel 500, and therefore are not a possible outcome for the wedge selection game until at least partially exposed. In some embodiments, the hidden portions of the hidden wedges may influence the upper game elements, such as, but not limited to, adjusting the award of the upper game elements and activating or deactivating a trigger condition for one or more features of the wedge selection game. In response to a shift of the moveable wedges 508 exposing at least a portion of the hidden wedges 518, a corresponding outcome probability is assigned to the exposed hidden wedges 518.

In the example embodiment, the third layer 506 is configured to include hidden or bonus features of the wedge selection game. That is, the features provided by the third layer 506 may not be active at the beginning of the wedge selection game, but rather are visibly uncovered or revealed in response to one or more trigger conditions of the wedge selection game. For example, in response to the moveable wedges 508 covering the first variable wedge 510 in its entirety, the third layer may present one or more reels in a first bonus feature space 520 for play of a reel-based feature (similar to the reel-based game shown in FIG. 3). In at least some embodiments, the bonus feature space 520 may be configured to present one or more underlying reels for play of a reel-based feature. In other embodiments, the bonus feature space 520 may reveal other game elements.

In the example embodiment, the third layer 506 further includes a segmented award wheel 522. The award wheel 522 includes a plurality of segments 524 that may be used to affect other game elements of the wheel 500 and/or to provide bonus awards during the wedge selection game. In other embodiments, the segments 524 of the award wheel 522 may be treated like hidden wedges 518 such that exposed segments 524 of the award wheel 522 may be assigned a corresponding outcome probability of the wedge selection game. The segments 524 may have a fixed size or dynamic size that is adjusted randomly and/or based on one or more parameters, such as, but not limited to, the state of the wheel 500, one or more specific outcomes of the wedge selection game, and the like. In certain embodiments, the awards associated with each segment 524 may be predetermined or dynamic. The award wheel 522 may be configured to spin or rotate to selectively expose a portion of the wheel 522 and/or to visibly identify a segment 524 as an award outcome. In certain embodiments, other suitable animations may be used, including animations incorporating the upper layers 502, 504 and/or a wedge selector (e.g., the selector 406, shown in FIG. 4). In one example, the award wheel 522 is configured to spin, and the wedge selector may be used to visibly identify the selected segment 524 of the wheel 522.

The award outcome may be determined through a process similar to the process executed for the outcome of a spin in the wedge selection game. The award outcome may influence a spin of the wedge selection outcome game and/or provide a bonus award to the player. In one example, a segment 524 selected for the award outcome has an associated bonus award that is applied to the second variable wedge 512 as the award for selecting the second variable wedge 512 in the wedge selection game. In another example, a bonus award is provided to the player if the selected segment 524 is exposed, where selecting an unexposed segment would result in no bonus award provided to the player for that given spin of the wheel 522. In some embodiments, several segments 524 may be selected for a single spin of the award wheel 522.

A spin of the award wheel 522 may be in response to one or more trigger conditions, and the number of spins may be a finite amount that is adjusted based on outcomes of the wedge selection game, award outcomes, and/or other parameters, such as wager amount or frequency. For example, spins of the award wheel 522 may be in response to every spin in the wedge selection game or in response to certain outcomes of the wedge selection game, such as selecting a trigger game wedge that causes the moveable wedges 508 to shift.

In some embodiments, the first layer 502 and/or the second layer 504 may be configured to selectively reveal game elements of the third layer 506. For example, the second layer 504 may be selectively transparent or translucent to enable a player to see through to the third layer 506. It is to be understood that the selective opacity of the second layer 504 may literally mean at least a portion of the second layer 504 becomes (graphically or mechanically) transparent or translucent, or that graphical priority is provided to the exposed game elements of the third layer 506, thereby creating the appearance of a transparent or translucent portion of the second layer 504.

Figure 6:
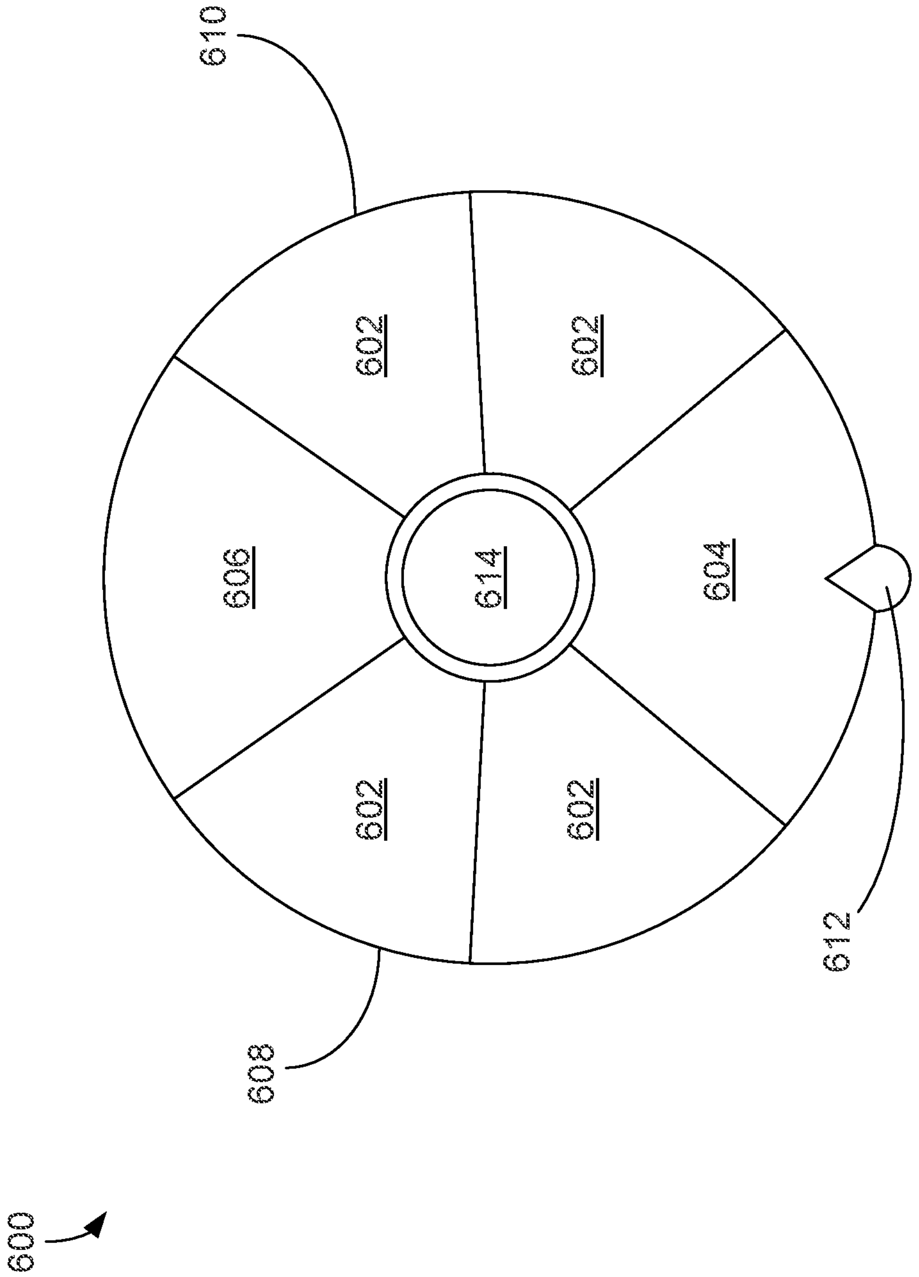
FIG. 6 is an image of an exemplary wheel in an initial state for an example wedge selection game according to one or more embodiments of the present disclosure.
Figure 7:
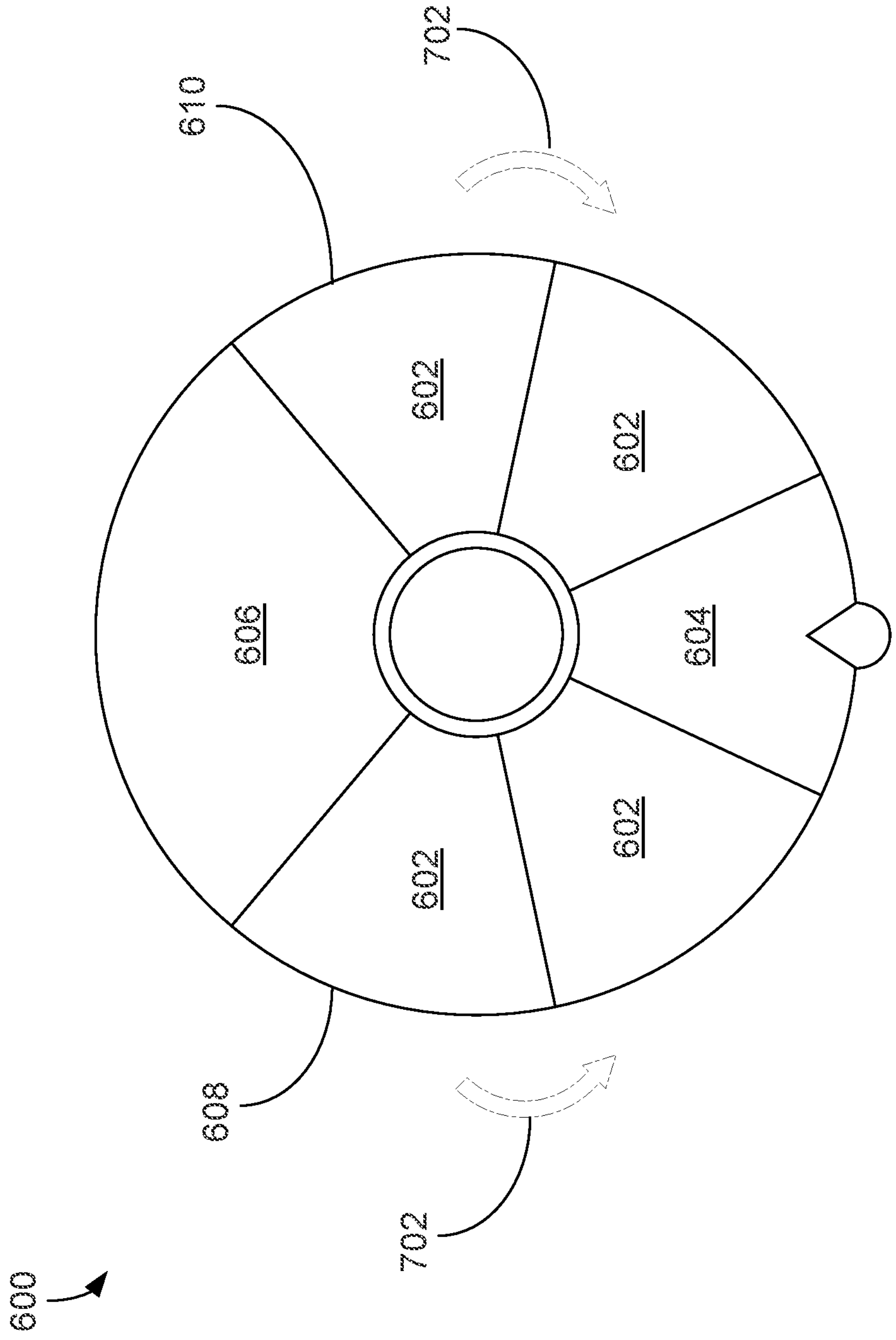
FIG. 7 is an image of the exemplary wheel shown in FIG. 5 in a first intermediate state according to one or more embodiments of the present disclosure.
Figure 8:
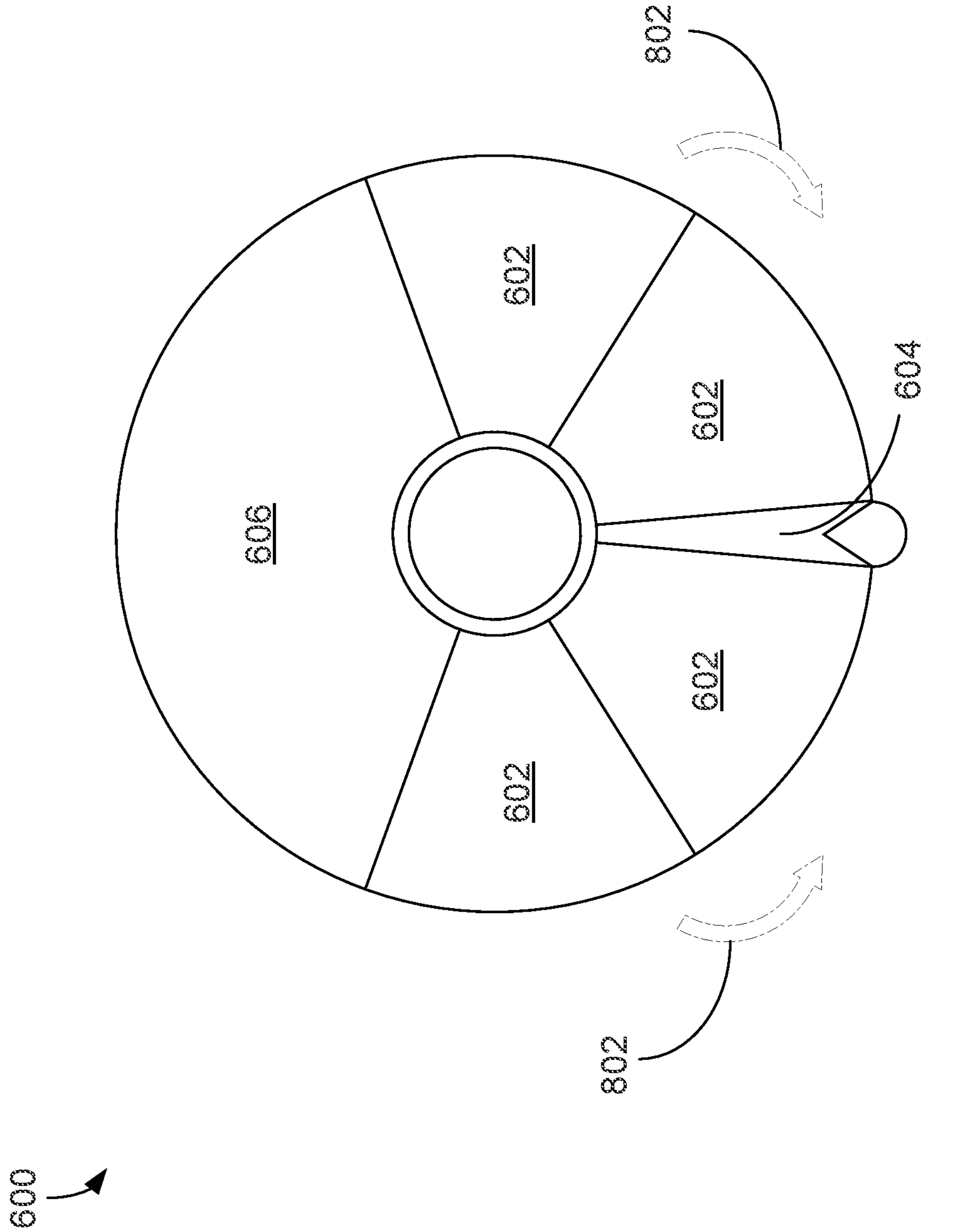
FIG. 8 is an image of the exemplary wheel shown in FIG. 5 in a second intermediate state according to one or more embodiments of the present disclosure.
Figure 9:
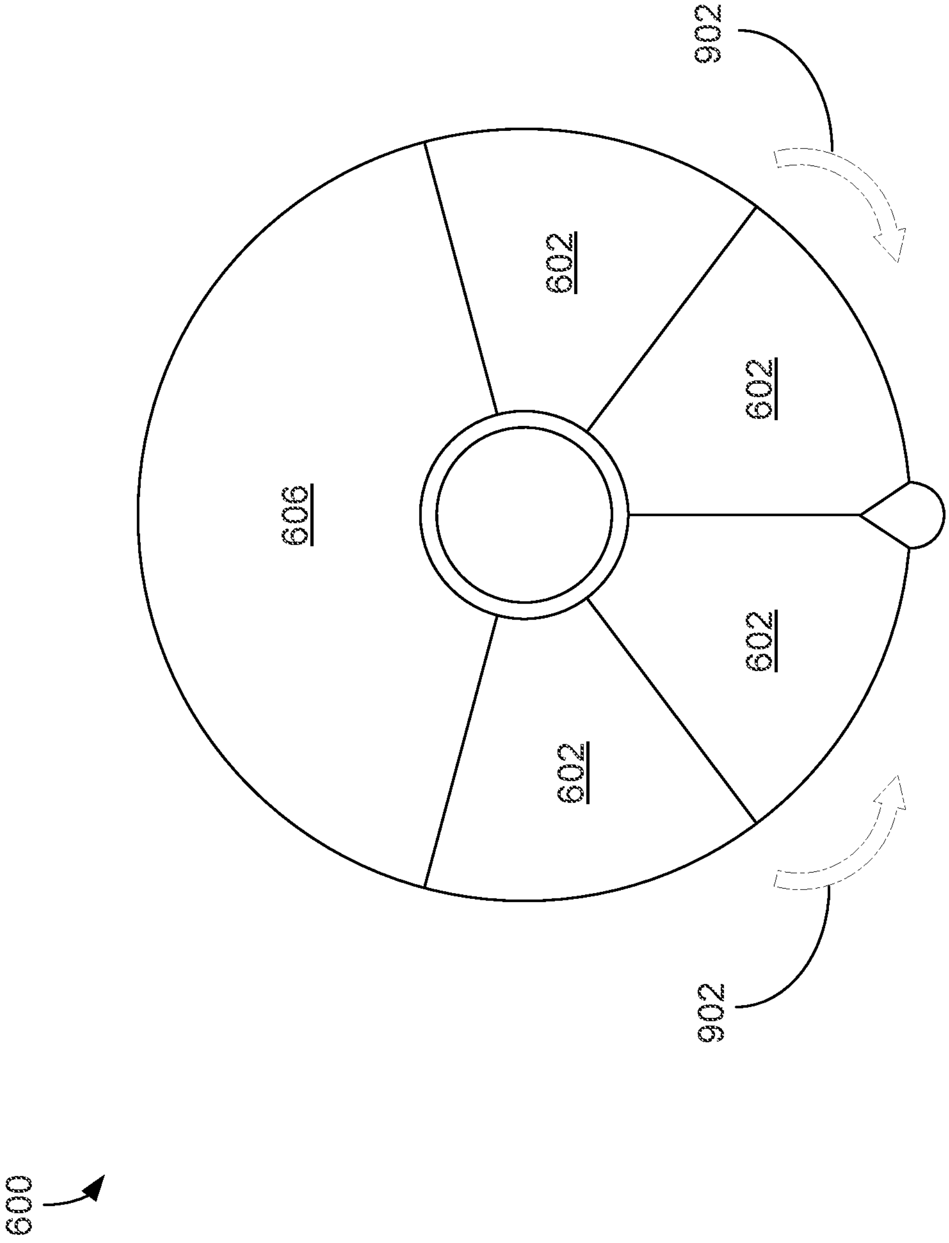
FIG. 9 is an image of the exemplary wheel shown in FIG. 5 in a closed state according to one or more embodiments of the present disclosure.
Figure 10:
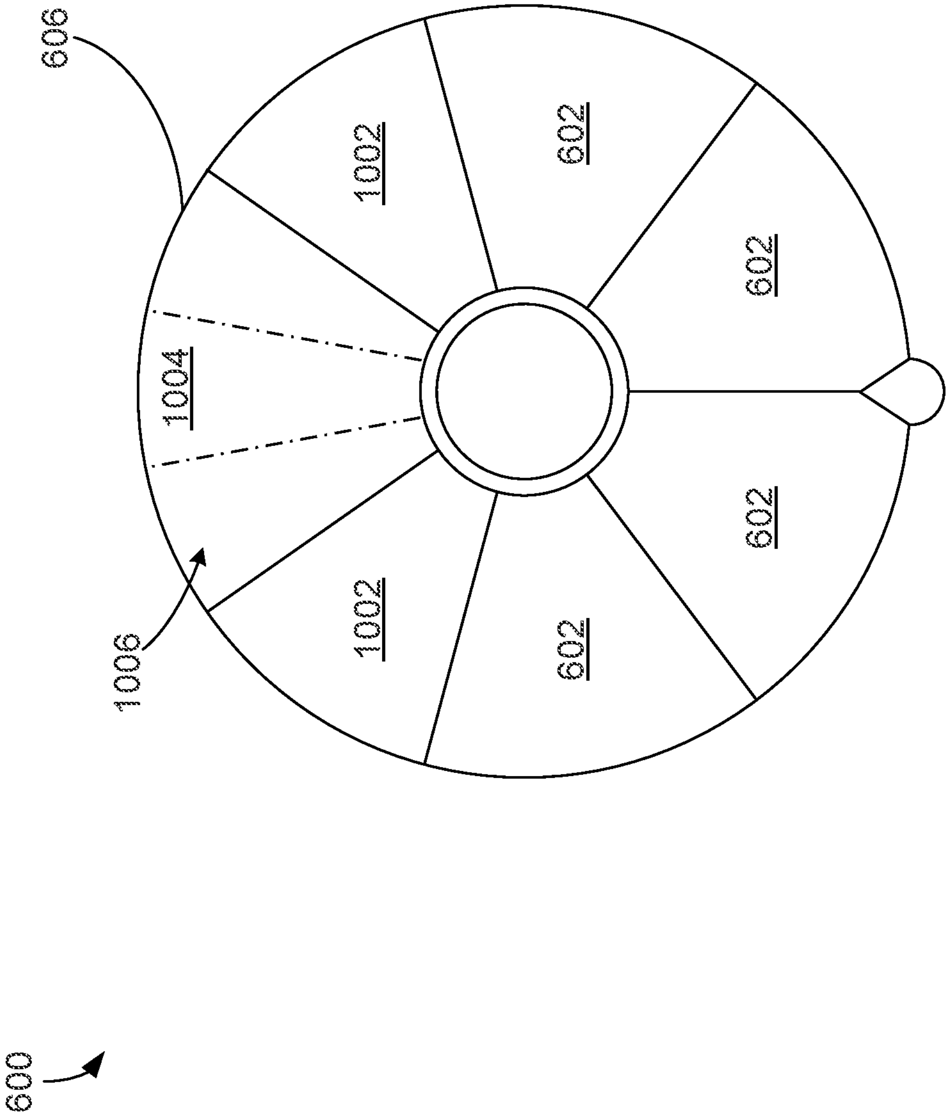
FIG. 10 is an image of the exemplary wheel shown in FIG. 6 revealing one or more hidden game elements according to one or more embodiments of the present disclosure.
Figure 11:
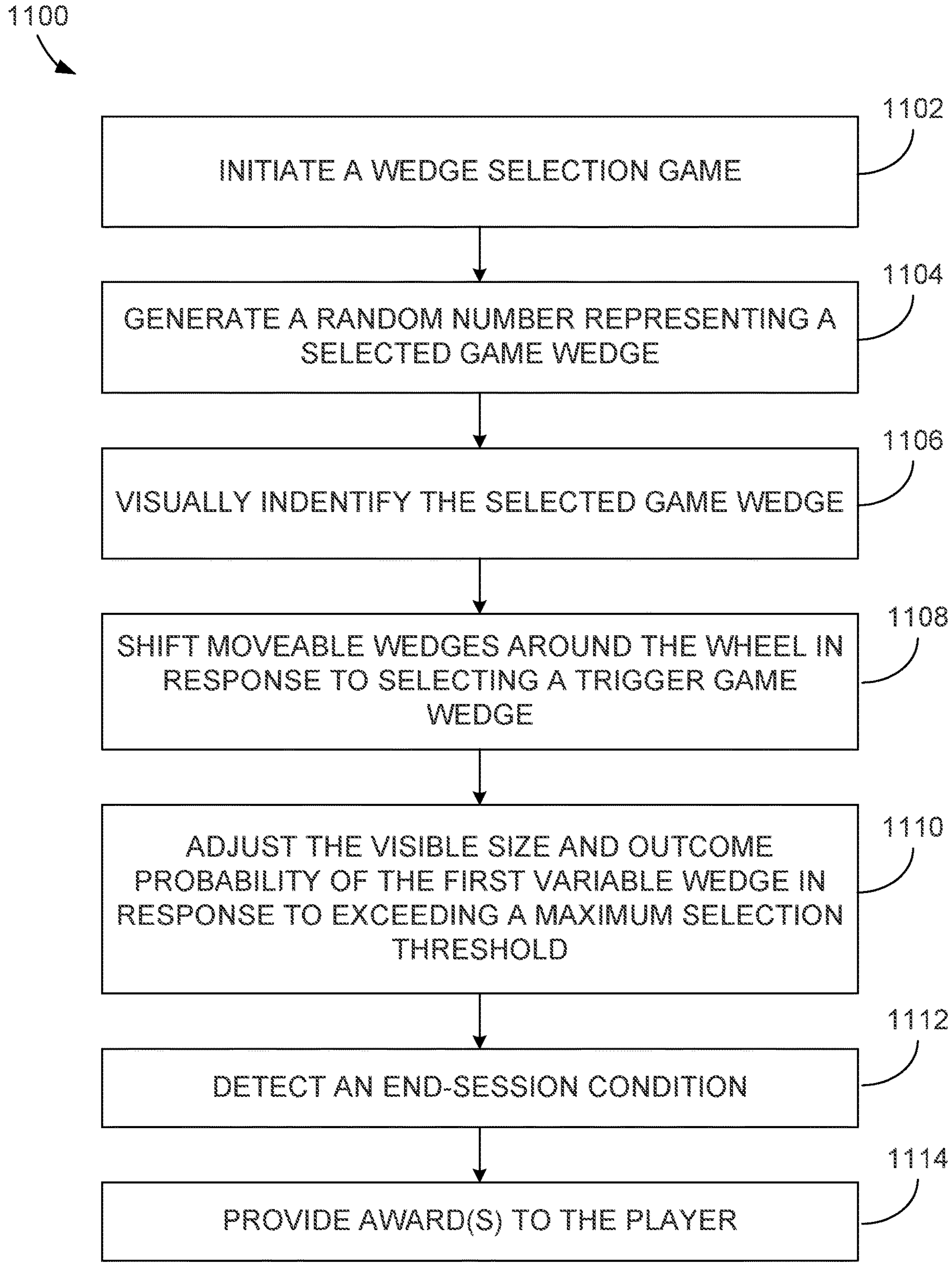
FIG. 11 is a flow diagram of an example method for conducting a wagering game including a wheel like the wheel shown in FIGS. 6-10 according to one or more embodiments of the present disclosure.

FIGS. 6-10 illustrate a dynamic progression of a wheel 600 through an example wedge selection game. More specifically, FIG. 6 depicts the wheel 600 in an initial state, FIG. 7 depicts the wheel 600 in a first intermediate state, FIG. 8 depicts the wheel 600 in a second intermediate state, FIG. 9 depicts the wheel 600 in a closed state, and FIG. 10 depicts hidden features of the wheel 600. The dynamic progression is further illustrated in FIG. 11 depicting a flow diagram of an example method 1100 for operating the wheel 600. In the example embodiment, the method 1100 is at least partially performed using the game-logic circuitry 40 and a display device (e.g., output devices 52) of the gaming machine 10 (each shown in FIG. 2). The wheel 600 includes moveable wedges 602, a first variable wedge 604, and a second variable wedge 606 similar to the wheels 404 and 500 shown in FIGS. 4 and 5, respectively.

With respect to FIGS. 6 and 11, the initial state of the wheel 600 may be displayed to the player in response to initiating 1102 the wedge selection game. In some embodiments in which the wedge selection game is a base game or a standalone game, the initiation 1102 of the wedge selection game may be in response to a wager provided by the player. In other embodiments in which the wedge selection game is a feature game, one or more events or parameters of the base game may activate the wedge selection game, such as particular outcomes of the base game triggering the wedge selection game. In some embodiments, the conditions for initiating 1102 the wedge selection game may alter or adjust the initial state of the wheel 600. For example, the size, placement, awards, and/or outcome probabilities of one or more wedges may be adjusted based on the conditions of the initiation 1102, such as wager amount, base game performance, and the like. In one example, the number of game wedges and/or the starting angle of one or more wedges, such as the moveable wedges 602, may be adjusted at least partially as a function of one or more initial conditions or parameters of the wedge selection game. In certain embodiments, rather than affecting the wheel 600, the conditions of the initiation 1102 may affect other game aspects related to the wheel 600, such as adjusting a number of free spins, applying a bonus multiplier to awards of the wedge selection game, etc.

In the example embodiment, a first set of moveable wedges 608 is diametrically opposed to a second set of moveable wedges 610, and the variable wedges 604, 606 are diametrically opposed from each other. The moveable wedges 602 each have a respective credit award that is applied to the player's credit balance when the corresponding game wedge is selected. The first variable wedge 604 has a bonus spins award that increases the number of spins the player is given for the wedge selection game. The second variable wedge 606 may have a minor jackpot award, a credit award, and/or other suitable award. In one example, the second variable wedge 606 may have a jackpot award that is achieved at least in part in response to a number of outcomes selecting the second variable wedge 606 exceeding an award threshold. The wheel 600 further includes a wedge selector 612 for identifying a game wedge as the outcome of a spin and a spin indicator 614 that indicates a remaining number of spins to the player. In the example embodiment, the wedge selection game may provide the player with an initial amount of spins (e.g., ten spins). Each spin decreases the indicator 614, while each outcome selecting the first variable wedge 604 adds spins to the indicator 614. The number of spins added by selecting the first variable wedge 604 may include any suitable number of spins (including one additional spin). In one example, selecting the first variable wedge 604 results in three free spins awarded to the player. In other embodiments, the wheel 600 may have a different configuration of wedges (e.g., the first and second set of moveable wedges 608, 610 may not be diametrically disposed due to the variable wedges 604, 606 having different visible sizes).

When viewing the wheel 600 as a whole in the initial state shown in FIG. 6, the relatively large size of the first variable wedge 604 translates into a relatively high outcome probability of receiving bonus spins (e.g., approximately 30-40% chance). If the wheel 600 remained static in the initial state, the wedge selection game may be perpetuated, which may yield an unsustainable payback percentage and may tax the available resources and random number generation draws of the gaming machine. However, initiating the wheel 600 with a low or non-existent first variable wedge 604 (e.g., FIG. 9) may be discouraging or unexciting for players. Therefore, a balance between a sustainable payback percentage of resource-efficient game and engaging, awarding game features may be achieved by adjusting the size of the first variable wedge 604 responsive to trigger conditions within the wedge selection game.

In the example embodiment, in response to user input of the player, a spin is initiated to play the wedge selection game. The game-logic circuitry 40 generates 1104 a random number to identify a selected game wedge from the visible wedges. The generated random number may be compared to a list of numbers, where each visible wedge of the wheel 600 is assigned one or more unique numbers on the list. If the generated random number matches a number assigned to a particular visible wedge, the visible wedge is then selected as an outcome for the spin. In other embodiments, other suitable methods and techniques using random number generation may be used to identify a selected game wedge for the outcome of the spin.

The wedge selector 612 then visually identifies 1106 the selected game wedge to the player. In the example embodiment, the wedge selector 612 is animated (graphically and/or mechanically) to move around a circumference of the wheel 600 and stops moving after a period of time such that the wedge selector 612 is oriented to point towards the selected game wedge. In the example embodiment, the wedge selector 612 stops within an arc segment of the wheel 600 that is shared by the selected game wedge. The award associated with the selected game wedge may then be provided to the player, and a counter for a number of remaining spins is adjusted (i.e., decremented unless additional spins are awarded and/or requested by the player). Subsequent spins may proceed using a similar process or an adjusted process in response to changes to the wheel 600 as described herein.

In the example embodiment, the first variable wedge 604 has been assigned as the trigger game wedge by the game-logic circuitry 40. The assignment of the trigger game wedge may be static or dynamic. That is, the trigger game wedge may always be a particular game wedge, or the trigger game wedge may be assigned responsive to one or more triggers, such as different initialization conditions, particular outcomes of the wedge selection game, and other suitable triggers. In one example, at the initial state of the wheel 600, the wedge selector 612 may spin to select the trigger game wedge prior to conducting the wedge selection game.

If the first variable wedge 604 is selected in the example embodiment, the configuration of the wheel 600 is adjusted. More specifically, the moveable wedges 602 shift 1108 in response to a selection of the trigger game wedge (i.e., the first variable wedge 604) such that the visible size and the outcome probability of the first variable wedge 604 is reduced for subsequent spins. The shift may be defined by a degree of rotation around a central axis of the wheel 600 (e.g., the central axis 501, shown in FIG. 5). In certain embodiments, the shift is a fixed amount such that each selection of the first variable wedge 604 (until a maximum selection threshold is reached or exceeded) causes the same degree of movement around the wheel 600 by the moveable wedges 602. In other embodiments, other suitable functions, including non-linear functions, may be used by the game-logic circuitry 40 to control the shifting of the moveable wedges 602. In embodiments in which the moveable wedges 602 are graphically displayed on the wheel 600, the animation of the moveable wedges 602 may be configured to create a perception of the moveable wedges 602 as physical objects, such as through the use of a physics engine.

In the example embodiment, the first set 608 and the second set 610 shift in equal and opposite directions to reduce the visible size of the first variable wedge 604. In some embodiments, the visible space on the wheel 600 that was previously occupied by the moveable wedges 602 prior to shifting may be incorporated within the second variable wedge 606 such that the visible size and the outcome probability of the second variable wedge 606 increases inversely proportional to the decrease of the first variable wedge 604. In other embodiments, at least a portion of the previously occupied visible space may expose one or more hidden wedges as described in further detail herein.

In at least some other embodiments, the moveable wedges 602 may be configured to move in a different suitable manner. In one example, the moveable wedges 602 may move asymmetrically around the wheel 600 such that each moveable wedge 602 or set of moveable wedges has its own degree of rotation when shifting. In another example in which the moveable wedges 602 can overlap each other, the topmost moveable wedges 602 may appear to be fixed in place (i.e., do not shift) while underlying moveable wedges 602 shift out from below the topmost moveable wedges 602, thereby visibly exposing the underlying moveable wedges 602 in a fan-like animation. In yet another example, sets of moveable wedges 608, 610 may include some wedges 602 that shift and others that remain fixed in place such that the sets 608, 610 may become fragmented into subsets and hidden wedges may be defined between the separated moveable wedges 602.

FIG. 7 illustrates the wheel 600 in a first intermediate state. The first intermediate state may be achieved in response to one or more selections of the first variable wedge 604. The first set of moveable wedge 608 has moved counterclockwise around the wheel 600 from the initial state, and the second set of moveable wedges 610 has moved clockwise, thereby shrinking the visible size of the first variable wedge 604. The direction of the movement is generally indicated by arrows 702. The game-logic circuitry 40 is configured to update the outcome probabilities of the wedges on the wheel 600. In the example embodiment, the outcome probabilities of the moveable wedges 602 remains the same as the initial state, while the outcome probability of the first variable wedge 604 decreases and the outcome probability of the second variable wedge 606 increases from the initial state such that the changes in outcome probabilities are directly proportional to the changes in visible size. It is to be understood that the animation of shifting the moveable wedges 602 and the updating of outcome probabilities may occur in any suitable order. That is, the animation may occur before, concurrent to, and/or after the updating of the outcome probabilities.

FIG. 8 illustrates the wheel 600 in a second intermediate state after one or more subsequent selections of the first variable wedge 604 after the first intermediate state shown in FIG. 7. The general direction of movement by the moveable wedges 602 to arrive at the second intermediate state may be indicated by arrows 802. It is to be understood that any suitable number of intermediate states may be present between the initial state and the closed state (shown in FIG. 9). While the first variable wedge 604 is still a possible outcome in the second intermediate state, the outcome probability has been reduced over the wedge selection game. However, in the example embodiment, the other awards associated with the moveable wedges 602 and the second variable wedge 606 are still available and have greater outcome probabilities relative to the outcome probability of the first variable wedge 604.

The progression of states on the wheel 600 provides the player with a clear outlook on the updated outcome probabilities based on the visible size of the wedges. That is, no outcome for a given spin is hidden from the player (unlike, for example, a reel-based game), and it is relatively easy for the player to then approximate the relative outcome probabilities of the game wedges as the moveable wedges 602 shift throughout the wedge selection game.

FIG. 9 illustrates the wheel 600 in a closed state. To achieve the closed state, the moveable wedges 602 have shifted as generally indicated by arrows 902 until the first variable wedge 604 has been hidden from view, thereby removing the first variable wedge 604 as a possible outcome for subsequent spins. In the example embodiment, the closed state is achieved by exceeding a maximum selection threshold for the first variable wedge 604 and, in response to exceeding the maximum selection threshold, the visible size and outcome probability of the first variable wedge 604 is adjusted 1110 to zero. In other words, the first variable wedge 604 can only be selected a predetermined number of times before the closed state is reached. In certain embodiments, the maximum selection threshold may account for other parameters beyond the number of outcomes selecting the first variable wedge 604 that may extend the number of spins prior to reaching the closed state, such as, but not limited to, a wager amount, one or more other outcomes of the wedge selection game, a player account associated with the player, and the like.

In the example embodiment, the wedge selection game is not wager-driven (i.e., a wager is not required to initiate a spin), but rather has a duration limited by a number of remaining free spins. In such an embodiment, the selection of the first variable wedge 604 may be the only way to receive additional spins within the wedge selection game to prolong the game and receive more awards. Thus, in response to exceeding the maximum selection threshold of the first variable wedge 604, the game-logic circuitry adjusts 1108 the visible size and the outcome probability of the first variable wedge 604 to zero. That is, when the closed state is achieved, no more bonus spins may be awarded, and the wedge selection game continues until no more spins are left.

In some embodiments, the closed state may not be a “final” state, but rather one or more trigger conditions may cause the moveable wedges 602 to shift away from the first variable wedge 604, thereby exposing at least a portion of the first variable wedge 604. In one example, the first variable wedge 604 may not have a bonus spins award, and each of the moveable wedges 602 may be configured for bidirectional movement around the wheel 600 such that both variable wedges 604, 606 may be subject to increasing or decreasing visible sizes and outcome probabilities.

FIG. 10 illustrates several example hidden features that may be exposed through the wedge selection game. In the example embodiment, the wheel 600 includes one or more hidden wedges 1002 and a plurality of award segments 1004 that define an underlying award wheel 1006 of the wheel 600. In other embodiments, the wheel 600 includes additional, fewer (including none), or alternative hidden features, including those described elsewhere herein.

The trigger conditions for the hidden features may be unique to each hidden feature and/or shared by a plurality of hidden features. For example, achieving the closed state may cause the game-logic circuitry 40 to expose one or more hidden features. Other trigger conditions may include, but are not limited to, combinations of outcomes over a number of spins, a number of spins left, a number of previous spins, the position of one or more wedges on the wheel 600, achieving an intermediate state (e.g., the intermediate states shown in FIGS. 7 and 8), base game performance and/or parameters, player account history, and/or trigger conditions associated with other exposed hidden features. In certain embodiments, the hidden features remain exposed until conclusion of the wedge selection game. In other embodiments, the hidden features may be hidden again responsive to one or more trigger conditions, such as the position of the moveable wedges 602 on the wheel 600. One or more hidden features may be at least partially exposed at the initial state of the wheel 600 and remain at least partially exposed throughout the wedge selection game (e.g., a portion of the award wheel 1006 may be exposed through the second variable wedge 606 for the duration of the wedge selection game as described herein).

The hidden wedges 1002 are game wedges that are hidden in the initial state of the wheel 600 and are exposed (i.e., visibly revealed) in response to one or more trigger conditions. The game-logic circuitry 40 may then assign an outcome probability to each hidden wedge 1002 that is reflected by the visible size of the respective hidden wedge 1002. In one example, the exposure of the hidden wedges 1002 may be caused by the moveable wedges 602 shifting away from the hidden wedges 1002 and/or upper layer game elements (e.g., the variable wedges 604, 606) becoming at least partially transparent or translucent to reveal the hidden wedges 1002 underneath. Although two hidden wedges 1002 are shown, it is to be understood that a different number of hidden wedges (including none and one) may be included on the wheel 600 in a different suitable configuration. In one example, a single hidden wedge 1002 associated with a jackpot award may be located on the wheel 600 such that the final shift of the moveable wedges 602 to the closed state exposes the hidden wedge 1002. In another example, a portion of the second variable wedge 606 may be changed to a hidden wedge 1002 in response to one or more trigger conditions.

The award segments 1004 are associated with one or more awards that may awarded via the wedge selection game and/or an award game using the award wheel 1006. That is, the award segments 1004 may be used to affect game elements of the wedge selection game (e.g., moveable wedges 602 and variable wedges 604, 606) by applying bonus awards, specifying the award for a particular game wedge (including awards that replace the existing award associated with the game wedge), and the like. A "spin" of the award wheel 1006 results in a selection of one or more segments 1004 as an outcome, and the awards of the selected segments 1004 are applied to the wheel 600 or to the player depending upon the nature of the awards. The number of spins of the award wheel 1006 may be dependent upon one or more parameters including, but not limited to, the number of spins of the wheel 600 remaining, the number of selections of the trigger game wedge, the state of the wheel 600, and/or a selection of a particular game wedge during the wedge selection game. In other embodiments, the number of spins of the award wheel 1006 is predetermined (e.g., one spin per wedge selection game). Each spin of the award wheel 1006 may be manual (i.e., response to player input) or automatic, and the spins may occur with any suitable relationship to the spins of the wheel 600 (e.g., before, after, during, and/or separately from the spins of the wheel 600).

In the example embodiment, a portion of the award wheel 1006 is revealed through the second variable wedge 606. The award wheel 1006 may be reveal in the closed state, prior states (including the initial state), and/or subsequent states of the wheel 600 not shown. In one example, a portion of the award wheel 1006 is shown through the second variable wedge 606 throughout the entirety of the wedge selection game. The game-logic circuitry 40 may be configured to generate one or more random numbers to determine an outcome for the award wheel 1006. In certain embodiments, generated random numbers may be the same random numbers used to select a game wedge of the wheel 600. In other embodiments, the random numbers may be generated separately. In certain embodiments, a single segment 1004 is visible through the second variable wedge 606. In other embodiments, a plurality of segments 1004 are visible through the second variable wedge 606.

In certain embodiments, the hidden features may not be limited to exposed hidden game elements, but may also include alterations to existing game elements. For example, the awards associated with the moveable wedges 602, the first variable wedge 604, and/or the second variable wedge 606 may change to an alternate award in response to one or more trigger conditions. In one specific example, the awards associated with each moveable wedge may increase in response to achieving the closed state on the wheel 600. In another example, at least some of moveable wedges 602 may combine together (either by joining at the boundaries or overlapping each other) during the wedge selection game such that the award of the resulting wedge is an aggregation of the awards from the combined moveable wedges 602. In yet another example, the number of bonus spins awarded for selecting the first variable wedge 604 may increase or decrease based on the number of previous selections of the first variable wedge 604. In at least some embodiments, the segments 1004 may affect other game elements of the wheel 600, such as by providing bonus or alternative awards to overlapping game wedges.

In one example, the award of the second variable wedge 606 in the wedge selection game is dependent upon at least one of the segments 1004 visible through the second variable wedge 606. That is, the visible segments 1004 are associated with a respective award, and the awards of at least one visible segment 1004 are applied to the second variable wedge 606 such that selecting the second variable wedge 606 will cause the applied awards to be provided to the player. In some embodiments, a single award associated with a single visible segment 1004 is applied to the second variable wedge 606. In other embodiments, multiple awards from multiple visible segments 1004 are aggregated and applied to the second variable wedge 606. For example, in FIG. 10, three segments 1004 are visible through the second variable wedge 606. In such embodiments, the awards of the three visible segments 1004 may be aggregated together and applied to the second variable wedge 606 such that a selection of the second variable wedge 606 in the wedge selection game will result in the aggregated award. In further embodiments, the visible segments 1004 may be incorporated into the wedge selection game. That is, the visible segments 1004 are assigned respective outcome probabilities within the wedge selection game to be added as possible outcomes of a spin of the wheel 600. In the example embodiment, the game-logic circuitry 40 is configured to update the wheel 600 in response to a spin of the award wheel 1006. For example, new segments 1004 may be visible through the second variable wedge 606, thereby altering the available awards.

In some embodiments the size of the segments 1004 and/or the number of segments 1004 selected for an outcome for a spin of the award wheel 1006 may be dynamically adjusted throughout the wedge selection game. In one example, the size of the segments 1004 and/or the number of selected segments 1004 is based on a visible size of the second variable wedge 606, where increasing the size of the second variable wedge 606 by shifting the moveable wedges 602 may cause the size or number of selected segments 1004 to increase. In such an example, while the possibility of additional spins for the wedge selection game decreases in response to one or more shifts of the moveable wedges 602, the same shifting may lead to increased awards to the player through the dynamic segments 1004.

In the example embodiment, play of the wedge selection game continues until the game-logic circuitry 40 detects 1112 an end-session condition, such as no remaining spins, has occurred. The awards for the wedge selection game are provided 1114 to the player, and other services or games are resumed on the gaming machine (e.g., a base game). The awards may be provided 1114 in response to each spin or at the conclusion of the wedge selection game. Afterwards, in response to the player triggering the wedge selection game, the wheel 600 is initiated in the initial state to begin another round of the wedge selection game.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a wheel, the wheel including a plurality of game wedges, the plurality of game wedges including a first variable wedge and at least one moveable wedge, each game wedge of the plurality of game wedges being associated with a respective award and a respective probability of selection, wherein the at least one moveable wedge are physical objects overlapping at least a portion of the wheel, the method comprising:
generating, using a random-number generator, a random number representing a selected game wedge of the plurality of game wedges; and
in response to a trigger game wedge of the plurality of game wedges being the selected game wedge, shifting the at least one moveable wedge around the wheel to decrease a visible size of the first variable wedge and the respective probability of selection of the first variable wedge proportional to the change in visible size, the first variable wedge remaining visible in response to the shift of the at least one moveable wedge, wherein the at least one moveable wedge are physical objects overlapping at least a portion of the wheel.

2. The method of claim 1, wherein each subsequent selection of the trigger game wedge further decreases the visible size and the respective probability of the first variable wedge.

3. The method of claim 2 further comprising, in response to the trigger game wedge being selected for a number of outcomes that exceeds a selection maximum, decreasing, by the game-logic circuitry, the variable size and the respective probability of the first variable wedge to zero such that the first variable wedge is hidden from the wheel.

4. The method of claim 1, wherein the respective award of the first variable wedge is one or more free spins.

5. The method of claim 1, wherein shifting the at least one moveable wedge further comprises:
exposing, by the display device, at least one hidden wedge of the plurality of game wedges in response to the shifting of the at least one moveable wedge;
assigning, by the game-logic circuitry, a respective outcome probability to each of the at least one hidden wedge in response to exposing the at least one hidden wedge; and
adjusting the respective outcome probability and a respective visible size of each of the at least one hidden wedge in response to subsequent shifting of the at least one moveable wedge.

6. The method of claim 1, wherein the first variable wedge is diametrically opposite a second variable wedge of the plurality of game wedges.

7. The method of claim 1, wherein the trigger game wedge is the first variable wedge.

8. A gaming machine comprising:
a display device configured to present a first variable wedge of a plurality of game wedges defining a wheel;
at least one moveable wedge of the plurality of game wedges, each of the at least one moveable wedge being a physical object overlapping a portion of the display device, wherein each game wedge of the plurality of game wedges associated with a respective outcome probability and a respective award; and
game-logic circuitry configured to:
generate, via a random-number generator of the game-logic circuitry, a random number representing a selected game wedge of the plurality of game wedges based on the respective outcome probabilities of the plurality of game wedges; and
in response to a trigger game wedge of the plurality of game wedges being the selected game wedge, cause the at least one moveable wedge to shift around the wheel to decrease a visible size of the first variable wedge and the respective outcome probability of the first variable wedge proportional to the change in visible size, the first variable wedge remaining visible in response to the shift of the at least one moveable wedge.

9. The gaming machine of claim 8, wherein each subsequent selection of the trigger game wedge further decreases the visible size and the respective probability of the first variable wedge.

10. The gaming machine of claim 9, wherein, in response to the trigger game wedge being selected for a number of outcomes that exceeds a selection maximum, decrease the variable size and the respective probability of the first variable wedge to zero such that the first variable wedge is hidden from the wheel.

11. The gaming machine of claim 10, wherein, in response to the first variable wedge being hidden, activate a hidden feature comprising at least one of an alternate award for one or more game wedges of the plurality of game wedges, exposing a hidden wedge of the plurality of game wedges, or exposing at least one symbol-bearing reel.

12. The gaming machine of claim 8, wherein the plurality of game wedges includes a second variable wedge, and wherein a visible size and the respective outcome probability of the second variable wedge change inversely proportional to the change in the visible size and the respective outcome probability of the first variable wedge.

13. The gaming machine of claim 8, wherein the wheel includes a first layer and a second layer, the first layer visibly overlapping at least a portion of the second layer, and wherein the first layer includes the at least one moveable wedge and the second layer includes the first variable wedge.

14. The gaming machine of claim 13, wherein the wheel includes a third layer visibly positioned under the second layer, the third layer including at least one of: (i) a hidden wedge of the plurality of game wedges that is hidden by at least one of the first layer and the second layer at an initial state of the wheel, the hidden wedge receiving a respective outcome probability in response to being exposed through the first layer and the second layer, (ii) at least one symbol-bearing reel for play of reel-based feature, or (iii) an underlying segmented award wheel.

15. A gaming system comprising:
a gaming machine comprising a display device configured to present at least a first variable wedge of a plurality of game wedges defining a wheel, the plurality of game wedges further comprising at least one moveable wedge physically overlapping a portion of the display device, each game wedge of the plurality of game wedges associated with a respective outcome probability and a respective award; and
game-logic circuitry configured to:
generate, via a random-number generator of the game-logic circuitry, a random number representing a selected game wedge of the plurality of game wedges based on the respective outcome probabilities of the plurality of game wedges; and in response to a trigger game wedge of the plurality of game wedges being the selected game wedge, cause the at least one moveable wedge to shift around the wheel to decrease a visible size of the first variable wedge and the respective outcome probability of the first variable game wedge proportional to the change in visible size, the first variable wedge remaining visible in response to the shift of the at least one moveable wedge, wherein the at least one moveable wedge are physical objects overlapping at least a portion of the wheel.

16. The gaming system of claim 15, wherein each subsequent selection of the trigger game wedge further decreases the visible size and the respective probability of the first variable wedge.

17. The gaming system of claim 15, wherein the display device includes a digital display presenting the first variable wedge, the at least one moveable wedge visibly overlaps a portion of a digital display.

18. The gaming system of claim 15, wherein the wheel is a physical object comprising at least a first layer including the at least one moveable wedge and a second layer including the first variable wedge, the first layer visibly overlapping the second layer.

19. The gaming system of claim 15, wherein a visible size of each of the at least one moveable wedges remains fixed throughout a wedge selection game including the wheel.

20. The gaming system of claim 15, wherein the at least one movable wedge includes a first set of movable wedges and a second set of movable wedges, the first set of moveable wedges and the second set of movable wedges being circumferentially disposed between the first variable wedge and a second variable wedge of the plurality of game wedges.

* * * * *